(12) United States Patent
Fischer et al.

(10) Patent No.: US 11,429,750 B2
(45) Date of Patent: Aug. 30, 2022

(54) EXECUTING ENCRYPTED DATA USING SECURE ENCLAVE

(71) Applicant: SAP SE, Walldorf (DE)

(72) Inventors: Andreas Fischer, Walldorf (DE); Jonas Janneck, Walldorf (DE); Joern Kussmaul, Walldorf (DE); Florian Kerschbaum, Walldorf (DE)

(73) Assignee: SAP SE, Walldorf (DE)

( * ) Notice: Subject to any disclaimer, the term of this patent is extended or adjusted under 35 U.S.C. 154(b) by 102 days.

(21) Appl. No.: 16/988,815

(22) Filed: Aug. 10, 2020

(65) Prior Publication Data

US 2022/0067179 A1 Mar. 3, 2022

(51) Int. Cl.
*G06F 21/53* (2013.01)
*G06F 21/62* (2013.01)
*G06F 21/60* (2013.01)
*G06F 12/14* (2006.01)
*G06F 9/30* (2018.01)

(52) U.S. Cl.
CPC ........ *G06F 21/629* (2013.01); *G06F 9/30174* (2013.01); *G06F 12/1408* (2013.01); *G06F 21/53* (2013.01); *G06F 21/602* (2013.01)

(58) Field of Classification Search
CPC ...... G06F 21/629; G06F 21/53; G06F 21/602; G06F 9/30174; G06F 12/1408
See application file for complete search history.

(56) References Cited

U.S. PATENT DOCUMENTS

| 2018/0211034 A1* | 7/2018 | Costa | G06F 9/45558 |
| 2020/0387893 A1* | 12/2020 | Maim | H04L 9/3234 |
| 2021/0224378 A1* | 7/2021 | Krey | G06F 9/45558 |

OTHER PUBLICATIONS

Fischer, Andreas, et al. "Computation on encrypted data using data flow authentication." arXiv preprint arXiv:1710.00390 (2017).*

* cited by examiner

*Primary Examiner* — Matthew T Henning
(74) *Attorney, Agent, or Firm* — Buckley, Maschoff & Talwalkar LLC (57) ABSTRACT

Provided is a system and method for executing an encrypted software program within a host platform. The execution may be bifurcated among a trusted module and an untrusted area of the host platform. In one example, the method may include receiving bytecode and encrypted data of a software program, decrypting, via a secure memory area, the encrypted data into decrypted data, executing, via the secure memory area, instructions from the bytecode on the decrypted data to generate execution results, encrypting the generated execution results, and transmitting the encrypted execution results to a remote computing device.

20 Claims, 6 Drawing Sheets

EXECUTING ENCRYPTED DATA USING SECURE ENCLAVE

BACKGROUND

Cloud services provide on-demand access to cost-efficient computing resources such as data storage and computing power. Often, cloud services are available over public networks and hosted by unknown service providers. As a result, data in the cloud may be at risk of theft from malicious users or unauthorized users (e.g., service providers, etc.) that may obtain information through side channels. For example, side channels can expose information about data files being stored, usage of the data files, usage of services, and the like. To ensure confidentiality of the data, encryption can be applied to the data prior to transferring it to the cloud. In this case, the cloud must operate on the encrypted data in order to maintain the confidentiality of the data.

Cryptographic techniques such as fully homomorphic encryption (FHE) enable arbitrary computations on the data that do not reveal any information about the data. Thus, the data may be protected from malicious or unauthorized users. However, computations on data that has been encrypted through FHE suffer high computational costs. For example, an application that is fully encrypted with homomorphic encryption can suffer from significant processing/computation delays. Therefore, while it is considered secure, the drawbacks of slow processing speed can outweigh the benefits of the security.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments are directed to a system for executing an encrypted software application on a host platform, such as a cloud platform. A client (e.g., a developer or other cloud customer) may compile an application-specific software application (e.g., Java, etc.) into a bytecode representation of the software application. Unlike human readable source code in which the application is developed/written, the bytecode includes compact numeric codes, constants, and/or references, which encode the result of a complier that parses and performs semantic analysis of items such as type, scope, nesting depths of program objects, etc.

In some embodiments, the compiler may include a bytecode-to-bytecode compiler that transforms a Java application that operates on unencrypted data into a bytecode representation that operates on encrypted data. This is referred to herein as transformed bytecode, or simply, bytecode. The transformed bytecode includes a list of instructions of the software application which can be executed on encrypted data. The instructions are designed for execution by an interpreter which can convert the bytecode into machine code. Examples of the operations included in the instructions are addition, multiplication, division, and the like. The client also takes the program (the bytecode) operating on plaintext data and transforms it into a program operating on encrypted data (ciphertext) using one or more encryption keys that are generated at the client device. In other words, the encryption process protects the data, but not necessarily the code. By encrypting the data and transforming the instructions of the program to operate on encrypted data, the system prevents an adversary from observing the data being computed on. The bytecode and the encrypted data is transferred from the client device to the host platform via a network communication, but not necessarily at the same time. The transformed bytecode only needs to be uploaded to the host platform initially. Meanwhile, different or multiple rounds of encrypted data may be uploaded to the host platform at different intervals, and executed by the transformed bytecode.

According to various embodiments, the host platform may include an untrusted area/domain, and a trusted module such as a software guard extension (SGX) by INTEL®. The trusted module may include instruction codes that are built into a central processing unit (CPU) of the host platform. The trusted module allows user-level code and operating system code to define private regions of memory, referred to as enclaves, where contents are protected and unable to be read or saved by processes outside of the enclave. The trusted module may use encryption by the CPU. The enclave and its contents are encrypted on the fly within the CPU itself. In this example, only the enclave is considered trusted while all other processes are treated as potential threats.

Therefore, the enclave contents can only be read in its encrypted form by programs/processes outside of the enclave.

When the client uploads the bytecode and the encrypted data to the host platform, the upload may initially be received by a component (e.g., an application class, etc.) of the application that is running within an untrusted domain/area of the host platform that is open to attack. However, the data is encrypted preventing it from being observed by an unauthorized process. The application class may determine which instructions of the bytecode should be processed within the trusted module. In some cases, instructions like storing and retrieving data to/from memory may be performed in the untrusted area of the host platform, while instructions such as addition, subtraction, multiplication, division, etc. are performed in the trusted module. The application class and the trusted module may be coupled to each other via a data flow authentication (DFA) wrapper which abstracts away the underlying encryption/decryption performed inside the trusted module. The application class may transfer the instructions and the encrypted data to the trusted module via the wrapper. The trusted module may include routines that are "application-independent" and executed on the encrypted data.

Upon receiving the bytecode and the encrypted data, the trusted module may decrypt the data, process the bytecode instructions on the decrypted data, encrypt the results, and return them to the application class via the DFA wrapper. The application class may combine any additional processing results performed outside of the trusted module to the encrypted results, and return the combined/executed results to a main component (e.g., a main class) of the application running on the client device, for verification.

Rather than rely on fully homomorphic encryption, the example embodiments may use symmetric encryption based on a symmetric key. The client may generate the keys and share them with the trusted module of the host platform. Therefore, only the client and the trusted module may be able to encrypt/decrypt the data being executed by the bytecode. The benefit here is that using a symmetric encryption scheme allows the data to be decrypted, and then processed by the host platform (via the trusted module) in contrast to a fully homomorphic encryption scheme which requires the host platform to compute on the encrypted data. Therefore, the speed of using the trusted module and the symmetric encryption can be much faster than using fully homomorphic encryption without a trusted module.

Figure 1:
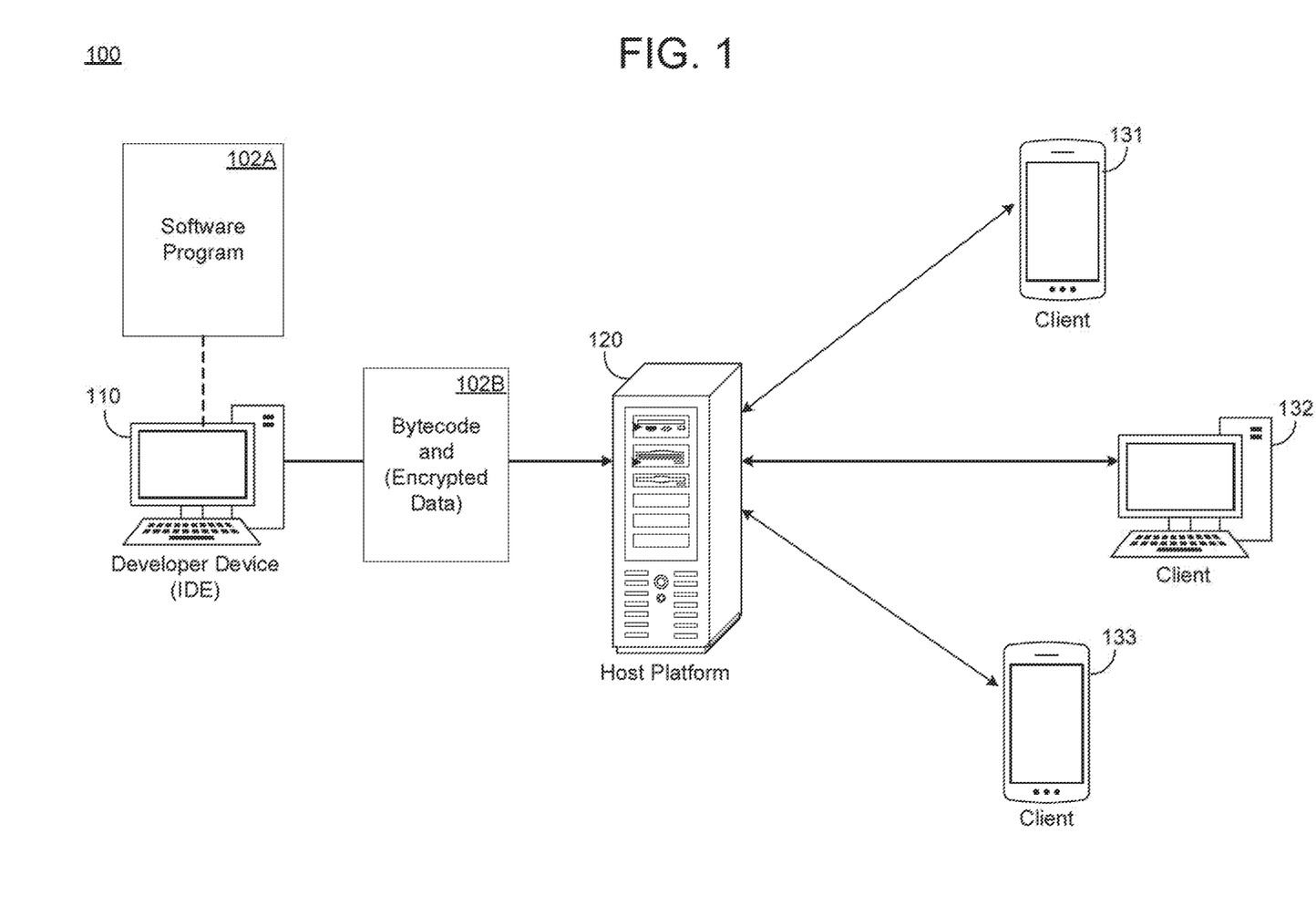
FIG. 1 is a diagram illustrating a computing environment for processing an application via a host platform in accordance with an example embodiment.

FIG. 1 illustrates a computing environment 100 for processing an application via a host platform 120 in accordance with an example embodiment. Referring to FIG. 1, a developer device 110 (e.g., a customer, an application developer, etc.) may be used to develop a software program 102A, such as an application, a service, or the like. However, rather than host the software program 102A locally on the developer device 110, the developer device 110 may upload the software program 102A to the host platform 120 where the code can be stored and executed. In this example, the developer device 110 and the host platform 120 may be connected to each other via a network such as the Internet. The developer device 110 may be a server, a user device, or the like, with an integrated development environment (IDE) installed and running therein. In some cases, the IDE may include an option for pushing a developed program to the host platform 120. Meanwhile, the host platform 120 may include a publicly accessible host device such as a server, a cloud computing platform, database, or the like.

Prior to uploading the software program 102A to the host platform 120, the developer device 110 may compile the software program 102A from a high-level programming language (e.g., Java, etc.) into bytecode and encrypt the data on which the bytecode is to operate on to generate bytecode and encrypted data 102B. The bytecode and encrypted data 102B may include a transformation of the human-readable source code of the software program 102A into bytecode comprising an intermediate representation (closer to machine code) that is capable of being executed by a virtual machine. The transformation of the bytecode and deployment to the target server may only need to be performed once and afterwards the program, including the transformed bytecode, can be invoked using newly encrypted data multiple times. The bytecode may include compact numeric codes, constants, and/or references, which encode the result of the complier that parses and performs semantic analysis of items such as type, scope, nesting depths of program objects, etc. Here, the bytecode is generated by a compiler, and is readable and executable by a virtual machine.

Figure 2A:
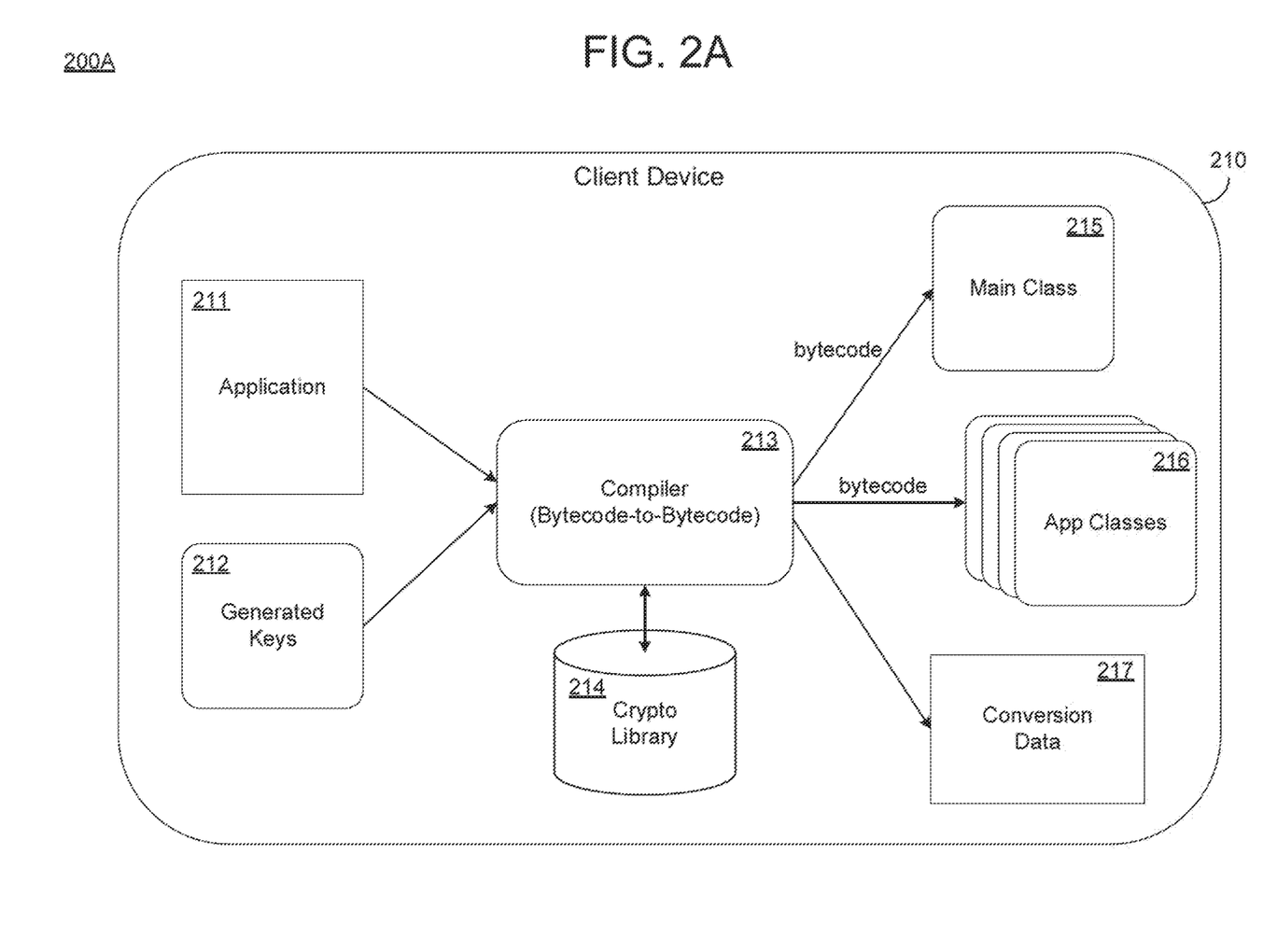
FIG. 2A is a diagram illustrating an architecture of a client device for compiling an application into bytecode and encrypted data in accordance with an example embodiment.
Figure 2B:
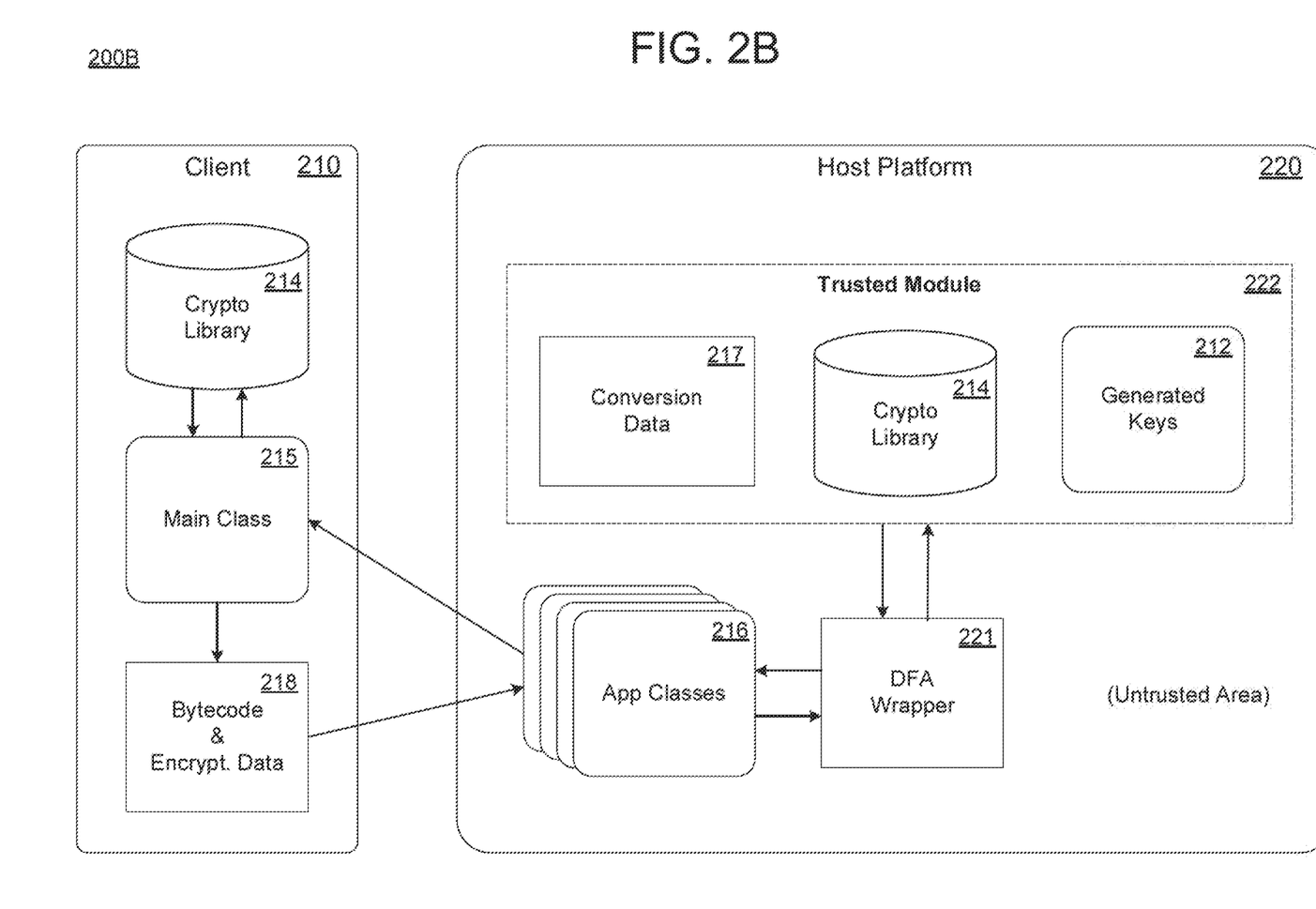
FIG. 2B is a diagram illustrating an architecture of the client device and a host platform executing encrypted data in accordance with an example embodiment.
Figure 3:
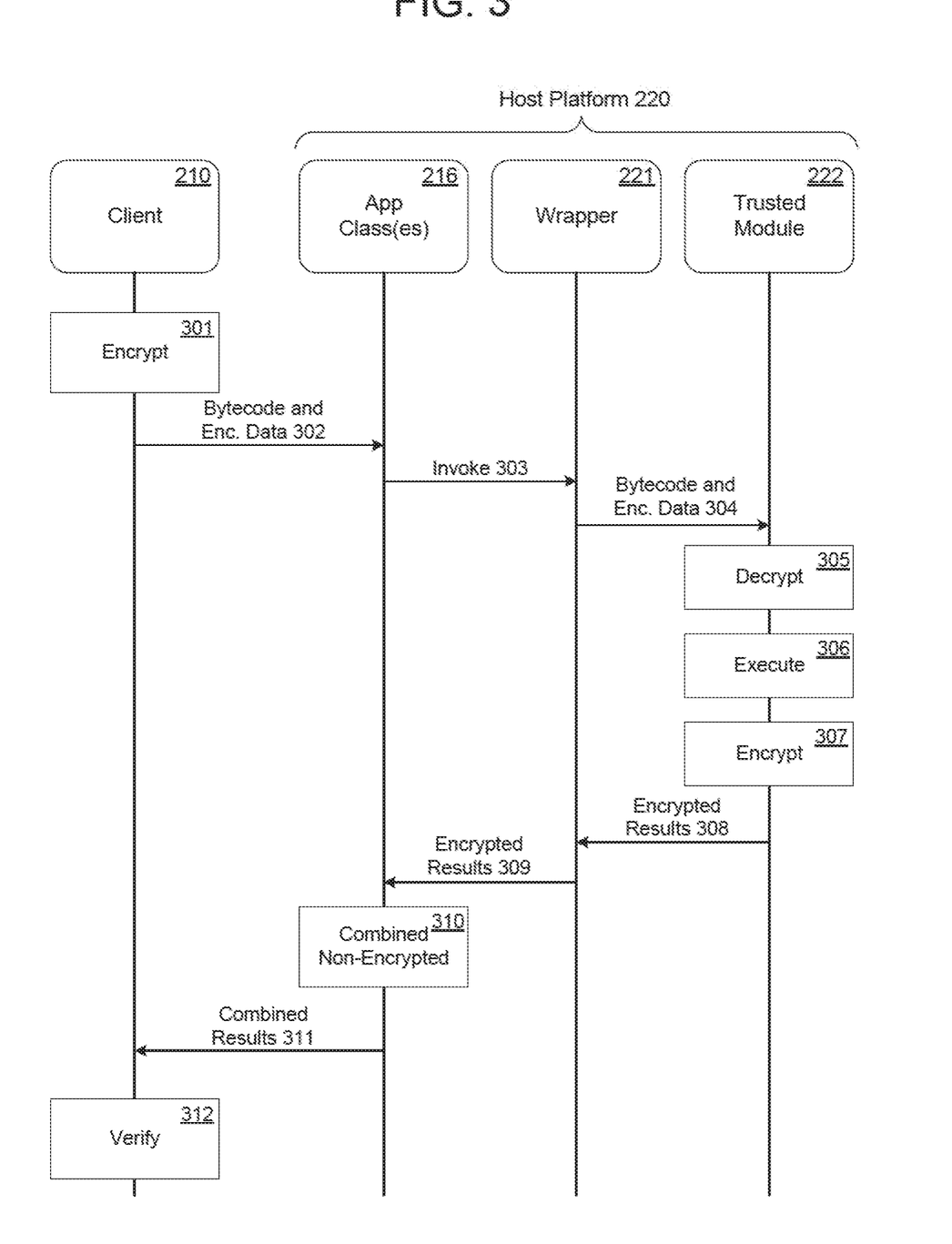
FIG. 3 is a diagram illustrating a communication sequence between a client and a host platform during application execution in accordance with an example embodiment.

The host platform 120 may include an untrusted area and a trusted area (referred to herein as a trusted module) which is further described in the examples of FIGS. 2A, 2B, and 3. The host platform 120 may bifurcate the bytecode 102B into instructions which are executed in the untrusted area of the host platform 120 and instructions which are executed within the trusted module of the host platform 120. Here, the encrypted data being processed by the instructions may be decrypted once inside the trusted module and executed thereby relieving the host platform 120 from having to compute fully homomorphic encrypted operations. Also, the results may be sent back to the client device 110 for verification.

Encrypting data before sending it to the host platform protects it against attackers, but requires the cloud to compute on encrypted data. Trusted modules, such as SGX enclaves, promise to provide a secure environment in which data can be decrypted and then processed. However, vulnerabilities in the executed program, which becomes part of the trusted code base (TCB), give attackers ample opportunity to execute arbitrary code inside the enclave. This code can modify the dataflow of the program and leak secrets via SGX side-channels. Since any larger code base is rife with vulnerabilities, it is not a good idea to outsource entire programs to SGX enclaves. A secure alternative relying solely on cryptography would be fully homomorphic encryption. However, due to its high computational complexity it is unlikely to be adopted in the near future. Researchers have made several proposals for transforming programs to perform encrypted computations on less powerful encryption schemes. Yet current approaches do not support programs making control-flow decisions based on encrypted data.

The example embodiments incorporate the concept of dataflow authentication (DFAuth) to enable execution of encrypted data. DFAuth prevents an adversary from arbitrarily deviating from the dataflow of a program. The technique hence offers protections against the side-channel attacks described above because of the program-independent trusted code base inside the trusted module (secure memory area). DFAuth may be implemented using an authenticated homomorphic encryption scheme, a Java bytecode-to-bytecode compiler producing fully executable programs, and an SGX enclave running a small and program-independent TCB.

Below is a simple example of instructions that may be included in a program.

$a=b+c;$ $d=a*e;$ if($d>42$)

$f=1;$ else $f=0;$

In the program above, the instructions represent a control flow (if—else statement) and arithmetic operations including an addition operation and a multiplication operation. Using DFAuth, each variable may receive a label such that only variables with a pre-approved dataflow can be used in the code. Variables carry unique identifiers that are preserved and checked during the encrypted operations. This prevents an adversary from deviating from the dataflow in ways that would allow attacks. A program may still have intentional leaks introduced by the programmer. However, DFAuth restricts the leakage of any program to these intended leaks by the programmer which the programmer could avoid by using appropriate algorithms such as data-oblivious ones. In essence, the technique restricts the information flows to those that are equivalent to the original program's information flows.

As previously noted, fully homomorphic encryption would be another alternative to compute on encrypted data without the drawback of data-leaks. However, due to its high computational complexity, researchers are seeking efficient alternatives that offer similar security.

In the examples herein, a trusted client provides an encrypted application to an untrusted host platform, which has a trusted (hardware) module, for example, an Intel® SGX enclave. In this example, the client may wish to execute a program at the cloud server with sensitive input data. The security objective is to leak only the information about the inputs to the host platform that can be inferred from the program's control flow. FIGS. 2A-2B illustrate two phases of this outsourced computation including a setup phase and a runtime. First, the client chooses the keys for the encryption and transforms the intended program using a specialized compiler. The client then uploads the encrypted and transformed application (i.e., compiled bytecode with encrypted data) to the host platform. In some embodiments, the client may choose from different encryption schemes including, but not limited to, homomorphic authenticated symmetric encryption (HASE) or trusted authenticated ciphertext operations (TACO). HASE relies on homomorphic encryption while TACO does not. Instead, TACO makes use of symmetric key encryption as an alternative for operating on ciphertexts.

The example embodiments may follow an model which assumes that an active adversary is controlling the host platform. Here, the assumption is that the active adversary can read the content of all variables and program text, except that in the trusted module, modify contents of all variables and the program, except in the trusted module, continuously observe and modify the control flow by breaking the program, executing instructions step-by-step, and modifying the instruction pointer, except in the trusted module.

FIG. 2A illustrates an architecture 200A of a client device 210 for compiling an application 211 into bytecode that operates on ciphertext in accordance with an example embodiment. Here, the architecture 200A may be used to perform a setup phase for running the application 211 at a host platform. Referring to FIG. 2A, a bytecode-to-bytecode compiler 213 may receive application code 211 and keys 212 that are generated by the client device 210. Here, the keys 212 may be used by the bytecode-to-bytecode compiler 213 to transform the application 211 (e.g., a Java application) into bytecode and encrypted data. A crypto library 214 may encrypt program constants and choose variable levels. The crypto library 214 may also include authentication labels for HMAC-SHA256. In this example, the bytecode-to-bytecode compiler may insert trusted module invocations into the program that decrypt and re-encrypt ciphertexts.

The application 211 may be broken down into a main class 215 which remains on the client device 210, and one or more application classes 216 which are uploaded to the host platform (shown in FIG. 2B). The bytecode and encrypted data may be provided to the main class 215 and the one or more application classes 216. The main class 215 may be the main method which is the entry point into the application 211. The main class 215 may include the application start code. The application classes 216 may include the remaining application data that is used to create and define objects, object data types, and methods. The application classes 216 may inherit from the main class 215 or from each other. Also, the application classes 216 may have conversion data 217 which includes labels and comparison data. Furthermore, during the setup phase, a secure channel may be established between the client device 210 and a trusted module 222 on a host platform 220 via one or more of the application classes 216 and a DFA wrapper 221.

FIG. 2B illustrates an architecture 200B of the client device 210 and the host platform 220 executing bytecode on encrypted data in accordance with an example embodiment. The process performed via the architecture 200B may be referred to as the runtime phase. Referring to FIG. 2B, the client device 210 deploys the application classes 216 to the host platform 220, and securely loads the cryptographic keys 212, the crypto library 214, and the conversion data 217 into the trusted module 222 of the host platform 220. The trusted module 222 may include a secure memory area (enclave) that is formed within a CPU on the host platform 220. As a non-limiting example, the trusted module 222 may be an SGX enclave.

The client device 210 can prepare and attest to the setup of the trusted module 222 remotely. Furthermore, the client device 210 can upload or otherwise transmit the bytecode and the encrypted data via the secure channel established during the setup phase between the client 210 and the trusted module 222 via the one or more application classes 216 and a DFA wrapper 221. The DFA wrapper 221 may abstract away the type of encryption performed by the trusted module 222 from the one or more application classes 216. Here, the trusted module 222 may perform TACO or HASE, depending on instructions provided from the DFA wrapper 221.

Meanwhile, the client device 210 retains the main class 215 which is used to generate bytecode and encrypted data 218 of the application 211, shown in FIG. 2A. The bytecode 218 may be transferred from the main class 215 on the client device 210 to the one or more application classes 216 on the host platform 220, via a network. Upon receiving the bytecode 218, the one or more application classes 216 may identify instructions within the bytecode to be performed by the trusted module 222 and forward the instructions and the encrypted data to be processed by the instructions to the DFA wrapper 221, which passes the instructions and encrypted data to the trusted module 222. The one or more application classes 216 may also perform operations from the bytecode such as storing and retrieving data from memory.

During operation, the client device 210 executes the main class 215 which triggers remote program execution of the one or more application classes 216 at the host platform. The main class 214 may encrypt the program input data with the generated keys 212 which may be stored in the crypto library 214. The main class 215 then transfers the bytecode and encrypted data 218 to the one or more application classes 216 at the host platform. The one or more application classes 216 may operate on the encrypted data without any additional protection. Furthermore, the one or more application classes 216 may invoke the DFA wrapper 221 which hides the encryption scheme of the trusted module 222 from the one or more application classes 216. The DFA wrapper 221 forward instructions from the bytecode and the encrypted data to the trusted module 222.

The trusted module 222 may decrypt the encrypted data using the encryption keys provided from the client device 210 during the setup phase, verify the authentication labels based on the conversion data 217, and compute the instructions on the data. Here, the crypto library 214 contains the code for performing cryptographic operations. One of the properties of DFAuth is that the code executing inside the trusted module 222 is application-independent. The encryption keys from the client device 210 are the data in this case, which gets loaded into the trusted module 222 in the setup phase. The trusted module 222 may encrypt the computation results and transfer the encrypted computation results to the one or more application classes 216 via the DFA wrapper 221. The encrypted results can be returned to the main class 215 on the client device 210 for verification by the main class 215. Here, the main class may compare the computation results to an authentication label generated by the client device 210, if desired. In the example embodiments, both TACO and HASE may be performed in the setup phase. A user may specify ahead of time which encryption scheme to use. While TACO involves more calls to the trusted module 222 (because all instructions are performed in the trusted module 222) it can have a significantly faster computation time than HASE which allows the host to operate on encrypted data. Thus, the total processing time (calls and computations) may be faster in the TACO scenario than the HASE scenario, even though TACO involves more calls to the trusted module 222. HASE and TACO are further described below.

In the examples herein, DFAuth takes a program (i.e. code) operating on plaintext data and transforms it into a program operating on encrypted data. This prevents an adversary from observing the data being computed on. However, DFAuth does not prevent the adversary from observing which instructions are executed, i.e. DFAuth protects data but not code. There is another property related to this process. That is, the code transformation only has to happen once. The transformed program can then be uploaded to the cloud server (or other host) and this also only has to be performed once. On the cloud server, the transformed program can then be invoked multiple times with freshly encrypted input data. Hence, the two stages in DFAuth: setup phase (compile/transform once) and runtime phase (run multiple times). In the example of FIG. 2B, the transformed program and the encrypted input data may be provided at the same time ("Bytecode & Encrypted Data 218"), but these uploads are not necessarily performed at the same time. Note that the compilation step in the setup phase outputs conversion data 217 which is uploaded to the trusted module 222 at the same time the transformed program is uploaded, and this data is different from the encrypted input data considered in 218.

FIG. 3 illustrates a communication sequence 300 between the client device 210 and the host platform 220 of the examples in FIGS. 2A and 2B during application execution in accordance with an example embodiment. Referring to FIG. 3, the client device 210 may connect to the host platform 220 through a bifurcated application where a main class of the application is running on the client device 210 and an application class 216 are running on the host platform 220. Here, the main class of the client device 210 may encrypt data to be computed/processed by the host platform 220, in 301. For example, the client device 210 may transform a program that is operating on cleartext data into a program that is operating on ciphertext or encrypted data. An adversary may still be able to view the operations being performed, but not the data being input, processed, and output. In 302, the client device 210 (e.g., the main class) may transfer the bytecode and the encrypted data to the application class 216 on the host platform 220. In 303, the application class 216 may invoke the wrapper 221 which receives the bytecode and the encrypted data from the application class 216 and transfers the bytecode and encrypted data to the trusted module 224, in 304.

In 305, the trusted module 222 decrypts the encrypted data within the secure memory area of the trusted module 222 based on encryption keys (e.g., symmetric encryption keys, etc.) which have been shared by the client device 210 and stored in the trusted module 222. In 306, the trusted module 222 executes instructions on data that has been decrypted to generate execution results. In 307, the trusted module 222 encrypts the execution results and transfers them to the wrapper 221 in 308. In 309, the wrapper 221 transfers the execution results to the application class 216.

If the application class 216 has executed any other operations from the bytecode (e.g., storing data to memory, retrieving data from memory, etc.) the application class 216 combines the results of the other operations with the encrypted execution results, in 310, and forwards the combined results to the client device 210 in 311. If the application class 216 did not perform any additional operations on the encrypted data, the application class forwards the execution results by themselves. In 312, the client device 210 may verify the execution results by decrypting the execution results using the corresponding symmetric encryption and comparing the decrypted results to an authentication label previously generated at the client device 210.

HASE Encryption Scheme

The HASE encryption scheme is one possible scheme that can be used for encrypting application bytecode at the client device before it is forward to the host platform. In this example, the trusted module may perform some of the operations of the control flow (e.g., addition or subtraction, but not both). Also, the application class and/or the DFA wrapper running outside of the trusted module (in the unsecure part of the host platform) may perform other parts of the control flow. Thus, some parts of the control flow are processed outside of the trusted module.

For security, confidentiality can be defined in terms of indistinguishability and authenticity in terms of unforgeability. Indistinguishability of HASE schemes (HASE-IND-CPA) is defined as an adaptation of the commonly used IND-CPA security definition for symmetric encryption schemes. Unforgeability of HASE schemes (HASE-UF-CPA) is based on a common unforgeable encryption definition.

Definition 1 (HASE Syntax) A HASE scheme is a tuple of probabilistic polynomial time (PPT) algorithms Gen, Enc, Eval, Der, and Dec such that a key-generation algorithm ("Gen") takes the security parameter as input and outputs a key pair ⟨ek, sk⟩ consisting of a public evaluation key (ek) and a secret key (sk). The evaluation key implicitly defines a commutative plaintext group ($\mathcal{M}$, ⊕), a commutative ciphertext group ($\mathcal{C}$, ⊗) and a commutative label group ($\mathcal{L}$, o). The encryption algorithm ("Enc") takes a secret key sk, a plaintext message m∈$\mathcal{M}$ and an identifier i∈$\mathcal{I}$ as input and outputs a ciphertext c∈$\mathcal{C}$. The evaluation algorithm ("Eval") takes an evaluation key ek and a set of ciphertexts C⊆$\mathcal{C}$ as input and outputs a ciphertext ĉ∈$\mathcal{C}$. The deterministic label derivation algorithm ("Der") takes a secret key sk and a set of identifiers I⊆$\mathcal{I}$ as input and outputs a secret label l∈$\mathcal{L}$. The deterministic decryption algorithm ("Dec") takes a secret key sk, a ciphertext c∈$\mathcal{C}$ and a secret label l∈$\mathcal{L}$ as input and outputs a plaintext message m∈$\mathcal{M}$ or ⊥ on decryption error.

Definition 2 (HASE Correctness) Let Π be a HASE scheme consisting of five algorithms as described above. Furthermore, let S:={(m, i): m∈$\mathcal{M}$, i∈$\mathcal{I}$} be a set of plaintexts with unique identifiers and let I: =π$_2$ (S) be the set of identifiers in S. In this example, Π is correct if for any honestly generated key pair ek, sk←Π.Gen( ) and any set of ciphertexts C:={c: c←Π.(sk, m, i): (m, i)∈S} it holds that $$\prod \cdot (sk, \prod \cdot (ek, C), \prod \cdot Der(sk, I)) = \bigoplus_{(m,i) \in S} m$$

except with negligible probability over ek,sk output by Π.Gen( ) and all c output by Π.( ).

Definition 3 (HASE-IND-CPA) A HASE scheme Π has indistinguishable encryptions under a chosen-plaintext attack, or is CPA-secure, if for all PPT adversaries there $\mathcal{A}$ is a negligible function negl (λ) such that $$Ad V_{\mathcal{A},\Pi}^{IND-CPA} (\lambda) := |Pr[ExpHAS E_{\mathcal{A},\Pi}^{IND-CPA} (\lambda) = 1] - \frac{1}{2}| \le negl(\lambda)$$

Here, the identifier parameter is incorporated into the encryption algorithm by allowing the adversary to submit an additional identifier argument to encryption oracle queries. The oracle enforces uniqueness of the identifier by keeping track of all queried plaintext-identifier pairs. It rejects any encryption query involving a previously used identifier. Furthermore, the adversary is allowed to pick the identifier used for the encryption of the challenge plaintext m$_b$.

Definition 4 (HASE-UF-CPA) A HASE scheme Π is unforgeable under a chosen-plaintext attack, or just unforgeable, if for all PPT adversaries $\mathcal{A}$ there is a negligible function negl (λ) such that $$Ad V_{\mathcal{A},\Pi}^{UF-CPA} (\lambda) := Pr[ExpHAS V_{\mathcal{A},\Pi}^{UF-CPA} (\lambda) = 1] \le negl(\lambda)$$

Here, the adversary returns a ciphertext c and a set of identifiers I. The adversary is successful if and only if two conditions are met. First, c has to successfully decrypt under the label derived from I. Second, the resulting plaintext m must be different from the plaintext M resulting from the application of the plaintext operation to the set of plaintexts corresponding to I. Note that by controlling I the adversary controls which elements of S are used for the evaluation resulting in m̂.

Data Flow Authentication

The example embodiments further introduce the concept of dataflow authentication (DFAuth) using an example. Consider the following excerpt from a Java program:

a=b+c;

d=a*e;

if(d>42)

f=1;

else f=0;

First, DFAuth performs a conversion to single static assignment (SSA) form, assigns each variable at exactly one code location, creates atomic expressions, and introduces fresh variables if required. In this case, the sample excerpt above becomes the following SSA assignment:

a=b+c;

d=a*e;

d1=d>42;

if(d1)

f1=1;

else f2=0;

f=phi(f1,f2);

In the example above, in SSA, phi is a specially interpreted merge function that combines the values of both assignments to f, here denoted by f1 and f2. DFAuth then performs a type inference. As a result of this inference, each variable and constant is assigned an encryption type of {add, mul, cmp}. At runtime, each constant and variable value will be encrypted according to the appropriate type. HASE implements multiplicative homomorphic encryption mul and its operations directly, while it implements additive homomorphic encryption add using exponentiation. Comparisons cmp are implemented in the trusted module described herein. Experiments show that this is more efficient than performing the comparison in the program space using conversion to searchable or functional encryption. An attacker observing user space will hence only see encrypted variables and constants, but can observe the control flow. Actual data values are hidden from the attacker.

Combinations of multiple operations, however, require additional work. Every time a variable is encrypted in one encryption type (e.g., additive), but is later used in a different one (e.g., multiplicative), DFAuth must insert a conversion. Any branch condition is also treated as a conversion that leaks the result of the condition check.

The security challenge of such conversions to cmp is that they leak information about the encrypted variables, and particularly that active adversaries that can modify the control and data flow can exploit those leaks to restore the variables' plaintext. Therefore, the system can restrict the dataflow using DFAuth. This allows such conversions in a secure way by enforcing that encrypted variables can be decrypted only along the program's original dataflow. The approach comprises two steps. First, happening at compile time, for each conversion. At runtime the computed labels as well as the secret key sk are kept secret from the attacker, which is why both are securely transferred to, and stored in, the trusted module during the setup phase. The trusted module registers the secret labels under the respective identifier.

All conversion routines run within the trusted module. They retrieve a secret label for an identifier with the help of a labelLookup(id) function. In particular, when the program runs and a conversion routine is invoked, the trusted module looks up and uses the required labels for decryption.

The system may derive labels from dataflow relationships that enforce a notion of interference equivalence. A program P is said to be non-interferent if applied to two different memory configurations $M_1$, $M_2$ that are equal with respect to their unclassified (unencrypted), memory locations, $M_1 =_L M_2$ for short, then also the resulting memory locations after program execution must show such low-equivalency: $P(M_1) =_L P(M_2)$. Non-interference holds if and only if there is no information flow from high, i.e. classified (encrypted), values to low memory locations. While this is a semantic property, previous research has shown that one can decide non-interference also through a structural analysis of programs, through so-called Program Dependency Graphs (PDGs) that capture the program's control and data flow. In this view, a program is non-interferent if the PDG is free of paths from high to low memory locations.

It may be assumed that the executed program before encryption already shows interference for some memory locations, e.g., because the program is, in fact, intended to declassify some limited information (notably control flow information). Let $M \downarrow C$ denote a projection of memory configuration M onto all (classified) memory locations C that are not declassified that way. Then even in the setting here it holds for any program P and any memory configurations $M_1$, $M_2$ that $P(M_1 \downarrow C) =_L P(M_2 \downarrow C)$.

The main point of the construction is that any program that an attacker can produce, and that would lead to the same computation of labels (and hence decryptable data) as the original program, cannot produce any more information flows than the original program. For example, tr may be a program transformation conducted by the attacker which inserted a binary search. Then the property to obtain is that:

$$\forall M_1, M_2, tr: P(M_1 \downarrow C) =_L P(M_2 \downarrow C) \Rightarrow$$
$$(tr(P))(M_1 \downarrow C) =_L (tr(P))(M_2 \downarrow C)$$

In other words, disregarding the explicitly declassified information within C, the transformed program does not leak any additional information, i.e., the adversary cannot learn any additional information about the encrypted data. If the above equation did not hold, there would exist a transformation tr that would cause the transformed program tr(P) to compute values in at least one low memory location despite low-equivalent inputs. But this is impossible, as any such transformation would necessarily have to insert additional PDG-edges, destroying at least one label computation, and hence invalidating the HASE-UF-CPA security proof.

Here, the client can verify the result of the computation using a simple check on the variable's label just as the conversion routine does. The result is just another variable, which albeit not being converted, can be checked for correct dataflow computation. That way, a client can ensure that it receives a valid output of the program.

TACO Encryption Scheme

DFAuth and HASE may be extended with TACO (Trusted Authenticated Ciphertext Operations), which is an alternative to HASE. TACO is similar to HASE in that text is encrypted, but the encryption is not fully homomorphic. Instead, the encryption can be a simpler encryption scheme (i.e., symmetric key encryption). Furthermore, TACO is more powerful since this schem enables multiplication, addition, and other operations such as division, etc. to be performed using the same generic construction. In symmetric key encryption, encryption algorithms use cryptographic keys for both encryption of plaintext and decryption of corresponding ciphertext. The encryptio and decryption keys may be identical or they may be a simple transformation to go between two keys. The key/keys represent a shared secret between two or more parties (in this case the client and the misted module).

In this scheme, the syntax, correctness and security of a TACO scheme can be defined based on the following. For the definition of TACO syntax, let M be the message space, C the space of ciphertexts, L the space of labels, K the space of keys and I the space of identifiers. Let $\Phi$ be a set of plaintext operations. Each $\varphi \in \Phi$ has a fixed number of parameters $p_\varphi$ such that $\varphi$ maps a $p_\varphi$-dimensional tuple $(m_1, \ldots, m_{p\varphi})$ with $m_i \in M$ to one message $\hat{m} \in M$. We define a TACO scheme using the following PPT algorithms.

The key-generation algorithm Gen takes the security parameter $1^\lambda$ as input and outputs a secret key $sk \in K$. The encryption algorithm Enc takes a secret key sk, a plaintext message $m \in M$ and an identifier $i \in I$ as input and outputs a ciphertext $c \in C$. The evaluation algorithm Eval takes a secret key $sk \in K$, a function $\varphi \in \Phi$ and a $p_\varphi$-dimensional tuple $(c_1, \ldots, c_{p\varphi})$ with $c_i \in C$ as input and outputs a ciphertext $\hat{c} \in C$ or $\perp$ on authentication error. The deterministic label derivation algorithm Der takes a secret key sk and additionally either an identifier $i \in I$ or a function $\varphi \in \Phi$ and a $p_\varphi$-dimensional tuple $(l_1, \ldots, l_{p\varphi})$ with $l_j \in L$ as input and outputs a label $\hat{l} \in \mathcal{L}$. The deterministic decryption algorithm Dec takes a secret key sk, a ciphertext $c \in C$ and a label $l \in L$ as input and outputs a plaintext message $m \in M$ or $\perp$ on decryption error.

The TACO structure is very similar to that of HASE. Important differences are that the evaluation can be done for different operations that do not have to be commutative. Furthermore, the labels no longer depend on the secret key and are therefore public. This does not limit security and further provides an advantage in the reusability of compiled programs, since labels only have to be calculated once. Moreover, it enables the implementation of mechanisms such as code signatures and hence avoids the need to compile the code on the client side.

For a TACO scheme to be correct, the decryption must be successful and deliver the expected value also after multiple evaluations. For this purpose following definitions are provided.

For the definition of TACO partial correctness, let H be a TACO scheme. In this example, H is partially correct if and only if $$\forall m \in M \forall i \in I: \Pi.Dec(sk, \Pi.Enc(m,i), \Pi.Der(i)) = m$$

In order to be able to make computations with ciphertexts, relationship between the TACO algorithms exist. Simplified, the evaluation of valid ciphertexts should result in a valid ciphertext again, whose corresponding label can be generated from the derivation function and which can be decrypted to the desired result of the operation.

For the definition of TACO correctness, let $\Pi$ be a partially correct TACO scheme. In this example, $\Pi$ is correct if for any secret key $sk \leftarrow \Pi.Gen(1\lambda)$, any function $\varphi \in \Phi$, any $p_\varphi$-dimensional tuple of ciphertexts $C := (c_1, \ldots, c_{p\varphi})$ with $c_j \in C$ and cj valid and any $p_\varphi$-dimensional tuple of labels $L:=(l_1, \ldots, l_{p\varphi})$ with $l_j \in L$ and $l_j$ valid for $c_j$, for the $p_\varphi$-dimensional tuple of plaintexts $M:=(m_1, \ldots, m_{p\varphi})$ with $m_j=\Pi.\text{Dec}(sk, c_j, l_j)$ it holds that $$\Pi.Dec(sk,\Pi.Eval(\varphi,C),\Pi.Der(\varphi,L))=\varphi(M)$$

As a security definition for TACO, a customized version for indistinguishability under chosen plaintext may be provided, very similar to $\text{ExpHASE}^{IND-CPA}$. Here, the attacker additionally gets access to an evaluation oracle, since evaluations cannot be performed without the secret key.

For the definition of TACO-IND-CPA, a TACO scheme Π has indistinguishable encryptions under a chosen-plaintext attack, or is CPA-secure, if for all PPT adversaries $\mathcal{A}$ there is a negligible function negl $(\lambda)$ such that $$\text{Adv}^{IND-CPA}_{\mathcal{A},\Pi}(\lambda):=|Pr[\text{ExpTAC}O^{IND-CPA}_{\mathcal{A},\Pi}(\lambda)=1]-\tfrac{1}{2}|\le \text{negl}(\lambda)$$

For the definition of TACO-UF-CPA, a TACO scheme H is unforgeable under a chosen-plaintext attack, or just unforgeable, if for all PPT adversaries $\mathcal{A}$ and all functions $\varphi \in \Phi_\Pi$ there is a negligible function $\text{negl}(\lambda)$ such that $$\text{Adv}^{UF-CPA}_{\mathcal{A},\Pi}(\lambda):=Pr[\text{ExpTAC}O^{IND-CPA}_{\mathcal{A},\Pi,\varphi}(\lambda)=1]\le \text{negl}(\lambda)$$

Example 1 below provides an example of a TACO-IND-CPA security experiment

---

$\text{ExpTAC}O^{\text{IND-CPA}}_{\mathcal{A},\Pi}(\lambda)$ $sk \leftarrow \Pi.\text{Gen}(1^\lambda)$
$(m_1, m_2, i_1, i_2, st) \leftarrow \mathcal{A}^{\Pi.Enc(sk,\cdot,\cdot),\Pi.Eval(sk,\cdot,\cdot)}(1^\lambda)$
$b \leftarrow \$\{0, 1\}$
$c \leftarrow \Pi.\text{Enc}(sk, m_b, i_b)$
$b' \leftarrow \mathcal{A}^{\Pi.Enc(sk,\cdot,\cdot),\Pi.Eval(sk,\cdot,\cdot)}(1^\lambda, c, st)$
return $b = b'$

---

Example 2 below provides an example of a TACO UF-CPA security experiment.

---

| $\text{ExpTAC} O^{UF-CPA}_{\mathcal{A},\Pi,\varphi}(\lambda)$ | $E(sk, m, i)$ |
|---|---|
| $S \approx \{\}$ | if $i \in \pi_2(S)$ then |
| $sk \leftarrow \Pi.\text{Gen}(1^\lambda)$ | return $\perp$ |
| $(c_1, c_2, l) \leftarrow \mathcal{A}^{E(sk,\cdot,\cdot),\Pi.Eval(sk,\cdot,\cdot)}(1^\lambda)$ | else |
| $m_1 \approx \Pi.\text{Dec}(sk, c_1, l)$ | $S \approx S \cup \{(m, i)\}$ |
| $m_2 \approx \Pi.\text{Dec}(sk, c_2, l)$ | $c \leftarrow \Pi.\text{Enc}(sk, m, i)$ |
| return $m_1 \ne \perp \wedge m_2 \ne \perp \wedge m_1 \ne m_2$ | return $c$ |

---

Example 2

For the definition of symmetric encryption, a symmetric encryption scheme SE is a tuple of PPT algorithms (Gen, Enc. Dec) such that Gen takes as input the security parameter $1\lambda$ and outputs a key $sk \in K:=\{0, 1\}^\lambda$; $sk \leftarrow \text{Gen}(R)$. In this example, Enc takes as input a key sk and a plaintext message $m \in M:=\{0, 1\}^*$ and outputs a ciphertext $c \in C:=(0, 1)^*$; $c \leftarrow \text{Enc}(sk,m)$. In addition, Dec takes as input a key $sk \in K$ and a ciphertext $c \in C$ and outputs a message $m:=\text{Dec}(sk, c)$. It is required that for every $\lambda$, every key sk output by $\text{Gen}(1\lambda)$ and every $m \in M$, it holds that $\text{Dec}(sk, \text{Enc}(sk, m))=m$.

For the definition of a hash function, a hash function is a pair of PPT algorithms (Gen, H) fulfilling the following properties, Gen takes as input a security parameter $1^\lambda$ and outputs a key $s \leftarrow \text{Gen}(1^\lambda)$. There exists a polynomial 1 such that H is deterministic and takes as input a key s and any $x \in \{0, 1\}^*$ and outputs $H(k, x) \in \{0, 1\}^{1(\lambda)}$. If for every $\lambda$ and k. $H(k, \cdot)$ is defined only over inputs of length $l'(\lambda)$ and $l'(\lambda) > l(\lambda)$, then (Gen,H) is a fixed-length hash function with length parameter $l'$.

Construction (TACO). Let $\Phi$ be a set of plaintext operations and $L:=\{0, 1\}\lambda$. Furthermore, let SE=(Gen, Enc, Dec) be a symmetric encryption scheme. Let $(\text{Gen}_H,H)$ be a fixed-length hash function with length parameter $l'(x)=x$ and let id: $\Phi \to \{0, 1\}^*$ be an injection. Construct a TACO scheme using the following PPT algorithms: Gen takes as input the security parameter $1^\lambda$ and outputs a secret key (sk, k) with $sk \leftarrow \text{SE.Gen}(1^\lambda)$ and $k \leftarrow \text{GenH}(1^\lambda)$.

Example 3 below provides an example of TACO decryption and evaluation.

---

| $\text{Eval}((sk, k), \varphi, (c_1, \ldots, c_{p\varphi}))$ | $\text{Dec}((sk, k), c, l)$ |
|---|---|
| for $1 \le i \le p_\varphi$ do | $d \approx \text{SE.Dec}(sk,c)$ |
| $d \approx \text{SE.Dec}(sk, c_i)$ | if $d = \perp$ then |
| if $d = \perp$ then | return $\perp$ |
| return $\perp$ | parse $d = m'||l'$ |
| parse $d = m_i || l_i$ | if $l \ne l'$ then |
| $m' \approx \varphi((m_1, \ldots, m_{p\varphi}))$ | return $\perp$ |
| $l' \approx \text{Der}(k, \varphi, (l_1, \ldots, l_{p\varphi}))$ | return $m'$ |
| return $\text{S.E.Enc}(sk, m'||l')$ | |

---

Example 3

In this example, Enc takes as input a secret key (sk, k), a message $m \in M:=\{0, 1\}^*$ and outputs $c \leftarrow \text{SE.Enc}(sk,m||\text{Der}(i))$. Eval takes as input a secret key (sk, k), an operation $\varphi \in \Phi$ and a $p_\varphi$-dimensional tuple of ciphertexts $(c_1, \ldots, c_{p\varphi})$ and outputs a ciphertext c according to the algorithm in example 3. Here, Der takes as input a secret key (sk, k) and an identifier $i \in I$ outputs the label $\hat{1}:=H(k, i||0)$ and also takes as input a secret key (sk, k), a function $\varphi \in \Phi$ and a $p_\varphi$-dimensional tuple of labels $(l_1, \ldots, l_{p\varphi})$ outputs the label $l:=H(k,\text{id}(\varphi)||l_1|| \ldots ||l_{p\varphi}||1)$. Meanwhile, Dec takes as input a secret key (sk, k), a ciphertext c and a label $1 \in L$ and outputs a message m or a decryption error $\perp$ as defined in example 3.

Furthermore, An authenticated encryption scheme that is used by TACO may be a symmetric encryption scheme which is IND-CCA secure and unforgeable. Collision resistance may also be defined. For example, (Gen, H) may be a hash function and $k \leftarrow \text{Gen}(1^\lambda)$. In this example, (Gen,H) is collision resistant if an adversary with knowledge of k cannot find a collision, i.e., a pair x, x' with $H(k, x)=H(k, x')$, except with negligible probability.

Figure 4:
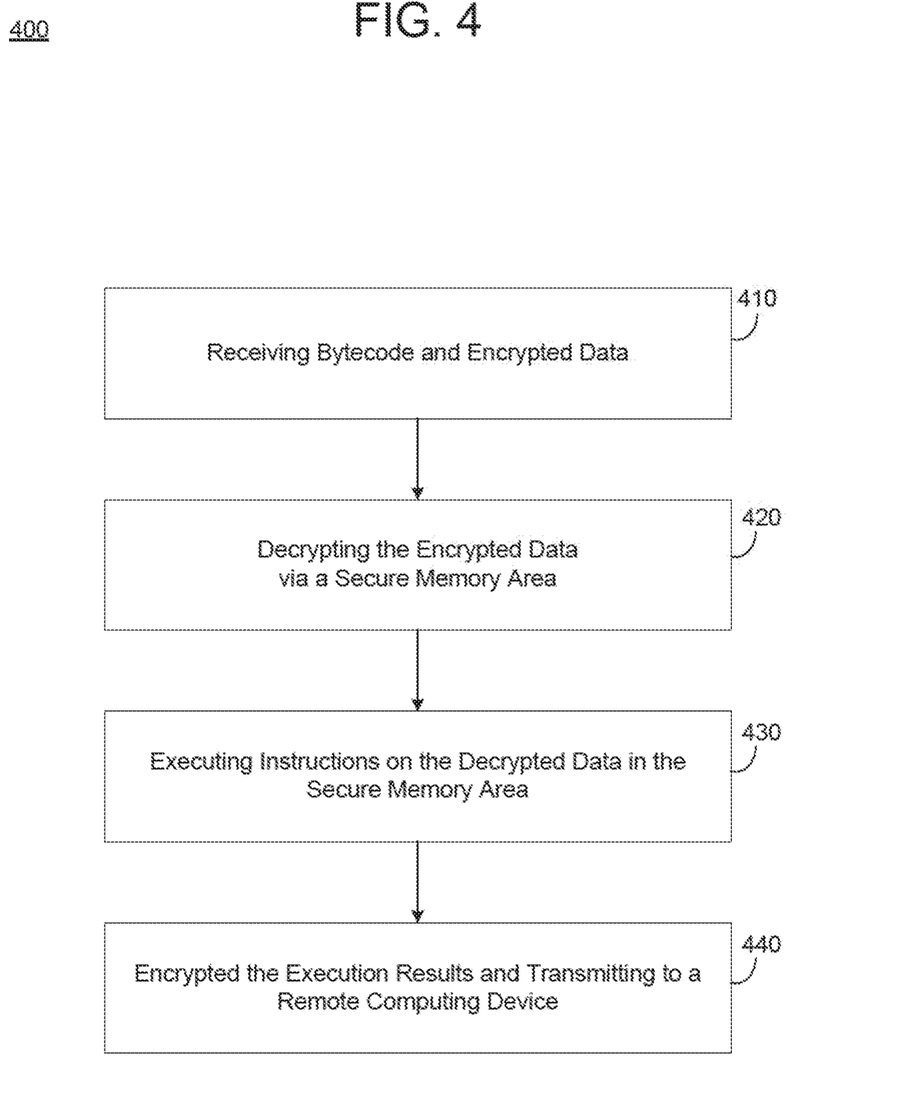
FIG. 4 is a diagram illustrating a method of executing an application in accordance with example embodiments.

FIG. 4 illustrates a method 400 of executing an application in accordance with example embodiments. For example, the method 400 may be performed by a software program such as an application, a service, or other program that is executing on a cloud platform, a server, a database node, a computing system (user device), a combination of devices/nodes, or the like. Referring to FIG. 4, in 410, the method may include receiving, via a host platform, bytecode and encrypted data of a software program. For example, the software program may include a software application, service, etc., such as a Java application that has been transformed into bytecode via a bytecode-to-bytecode compiler while the data to be operated on by the bytecode has been encrypted. The compiling may be performed by a client device that uploads the bytecode and the encrypted data to the host platform.

In some embodiments, the receiving may include receiving the bytecode and encrypted data via an application class of the software program which is executing on the host platform independent from the secure memory area. In some embodiments, the receiving may include receiving the bytecode and encrypted data from a main class of the software program which is executing on the remote computing device and which is communicably coupled to the application class. Here, the main class and the application class or classes may be generated by the compiling as well.

In 420, the method may include decrypting, via a secure memory area of the host platform, the encrypted data into decrypted data comprising data to be executed by the instructions/operations of the software program which are include in the bytecode. As an example, the secure memory area may include a software guard extension (SGX) enclave that is built into a memory of a central processing unit (CPU) of the host platform.

In 430, the method may further include executing, via the secure memory area of the host platform, the instructions from the bytecode on the decrypted data to generate execution results. Furthermore, in 440, the method may include encrypting the generated execution results and transmitting the encrypted execution results to a remote computing device. In some embodiments, the executing may further include executing one or more other operations of the software program via an untrusted module of the host platform. In some embodiments, the untrusted module is communicably coupled to the secure memory area via a wrapper. In some embodiments, the decrypting may include decrypting the encrypted data based on an authenticated secret key that is stored within the secure memory area.

For example, the client device where the compiling occurs may include keys which are generated for encrypting the data. The client device may upload the keys to the trusted module of the host platform where the keys may be stored and hidden from processes that are running in the untrusted area of the host platform. The keys may be generated by the client device and may include symmetric keys, etc. By using symmetric key encryption, the data may be decrypted with a corresponding key thereby relieving the host platform from having to compute on encrypted data. Instead the host platform may execute the bytecode on data in its unencrypted form.

Figure 5:
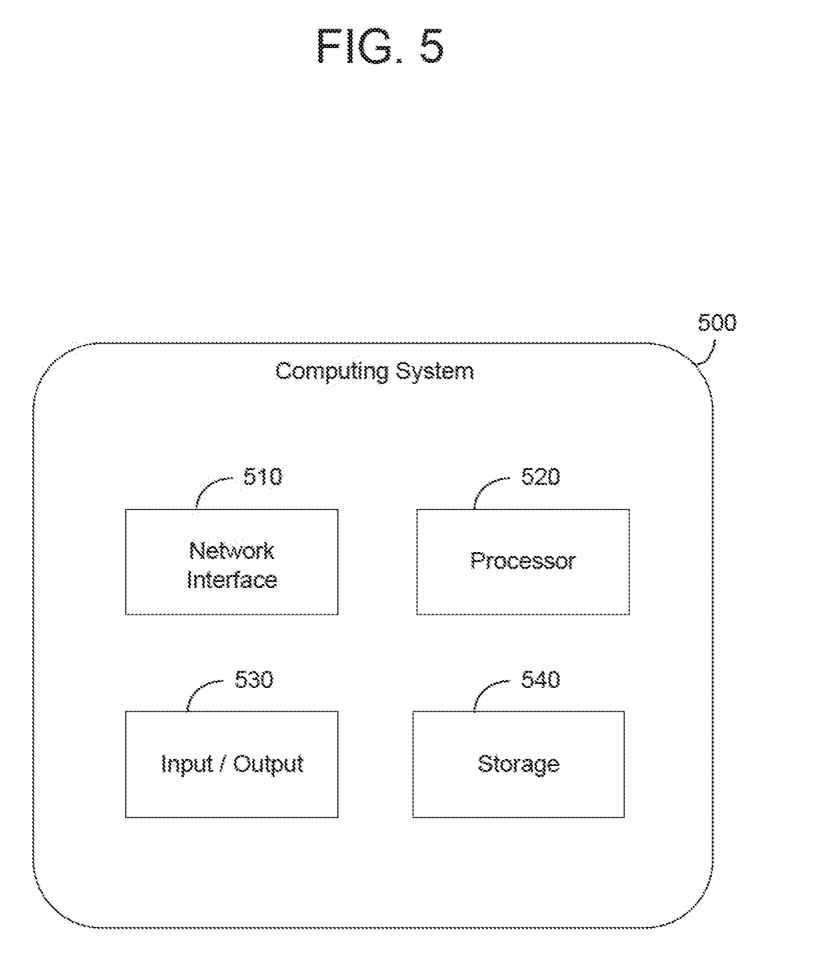
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, partitions and sub-partitions. The storage 540 may be used to store database records, items, entries, and the like. In some embodiments, the storage 540 may be configured to store instructions for managing a configuration repository for a distributed system.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
 a network interface configured to receive ciphertext comprising encrypted data of a software program and bytecode configured to operate on the ciphertext; and
 a processor configured to
  divide the bytecode into a first set of instructions to be executed inside a secure memory area of a host platform and a second set of instructions to be executed by the host platform in an area outside of the secure memory area based on types of instructions in the bytecode,
  decrypt, via the secure memory area of the host platform, the encrypted data included in the ciphertext into decrypted data,
  execute, via the secure memory area of the host platform, the first set of instructions from the bytecode on the decrypted data to generate first execution results,
  execute in the area of the host platform outside the secure memory area, the second set of instructions from the bytecode on the ciphertext to generate second execution results,
  encrypt the first execution results, and
  combine the encrypted first execution results with the second execution results to create a combined encrypted execution result and transmit the combined encrypted execution result to a remote computing device.

2. The computing system of claim 1, wherein the processor is configured to receive the bytecode and the encrypted data via an application class of the software program which is executing on the host platform independent from the secure memory area.

3. The computing system of claim 2, wherein the bytecode and encrypted data are received from a main class of the software program which is executing on the remote computing device and which is communicably coupled to the application class.

4. The computing system of claim 1, wherein the secure memory area comprises a software guard extension (SGX) enclave that is built into a memory of a central processing unit (CPU) of the host platform.

5. The computing system of claim 1, wherein the processor is further configured to execute the second set of instructions from the bytecode of the software program via an untrusted module of the host platform.

6. The computing system of claim 5, wherein the area of the host platform outside the security memory area is communicably coupled to the secure memory area via a wrapper.

7. The computing system of claim 1, wherein the software program comprises a Java program that is transformed into bytecode operating on ciphertexts via a bytecode-to-bytecode compiler.

8. The computing system of claim 1, wherein the processor is configured to decrypt the encrypted data, via the secure memory area, based on a symmetric secret key that is stored within the secure memory area and that is shared between the secure memory area of the host platform and the remote computing device.

9. A method comprising:
 receiving, via a network interface, ciphertext comprising encrypted data of a software program and bytecode configured to operate on the ciphertext which are transmitted from a client to a host platform;
 dividing the bytecode into a first set of instructions to be executed inside a secure memory area of a host platform and a second set of instructions to be executed by the host platform in an area outside of the secure memory area based on types of instructions in the bytecode;
 decrypting, via the secure memory area of the host platform, the encrypted data included in the ciphertext into decrypted data;
 executing, via a secure memory area of the host platform, the first set of instructions from the bytecode on the decrypted data to generate first execution results;
 executing, in the area of the host platform outside the secure memory area, the second set of instructions from the bytecode on the ciphertext to generate second execution results; and
 encrypting, via the secure memory area, the first execution results,
 combining the first execution results with the second execution results to create a combined encrypted execution result and transmitting the combined encrypted execution result to a remote computing device.

10. The method of claim 9, wherein the receiving comprises receiving the bytecode and encrypted data via an application class of the software program which is executing on the host platform independent from the secure memory area.

11. The method of claim 10, wherein the receiving comprises receiving the bytecode and encrypted data from an instance of the software program which is executing on the remote computing device and which is communicably coupled to the application class.

12. The method of claim 9, wherein the secure memory area comprises a software guard extension (SGX) enclave that is built into a memory of a central processing unit (CPU) of the host platform.

13. The method of claim 9, wherein the executing further comprises executing the second set of instructions from the bytecode of the software program via an untrusted module of the host platform.

14. The method of claim 13, wherein the area of the host platform outside the secure memory area is communicably coupled to the secure memory area via a wrapper.

15. The method of claim 9, wherein the software program is transformed into bytecode operating on ciphertexts via a bytecode-to-bytecode compiler.

16. A non-transitory computer-readable medium comprising instructions which when executed by a processor cause a computer to perform a method comprising:
 receiving, via a network interface, ciphertext comprising encrypted data of a software program and bytecode configured to operate on the ciphertext which are transmitted from a client to a host platform;
 dividing the bytecode into a first set of instructions to be executed inside a secure memory area of a host platform and a second set of instructions to be executed by the host platform in an area outside of the secure memory area based on types of instructions in the bytecode;

decrypting, via the secure memory area of the host platform, the encrypted data included in the ciphertext into decrypted data;

executing, via a secure memory area of the host platform, the first set of instructions from the bytecode on the decrypted data to generate first execution results;

executing, in the area of the host platform outside the secure memory area, the second set of instructions from the bytecode on the ciphertext to generate second execution results; and encrypting, via the secure memory area, the first execution results, combining the first execution results with the second execution results to create a combined encrypted execution result and transmitting the combined encrypted execution result to a remote computing device.

17. The non-transitory computer-readable medium of claim 16, wherein the receiving comprises receiving the bytecode and encrypted data via an application class of the software program which is executing on the host platform independent from the secure memory area.

18. The non-transitory computer-readable medium of claim 17, wherein the receiving comprises receiving the bytecode and encrypted data from a main class of the software program which is executing on the remote computing device and which is communicably coupled to the application class.

19. The non-transitory computer-readable medium of claim 16, wherein the secure memory area comprises a software guard extension (SGX) enclave that is built into a memory of a central processing unit (CPU) of the host platform.

20. The non-transitory computer-readable medium of claim 19, wherein the area of the host platform outside the secure memory area is communicably coupled to the secure memory area via a wrapper.

* * * * *